Patented Oct. 27, 1953

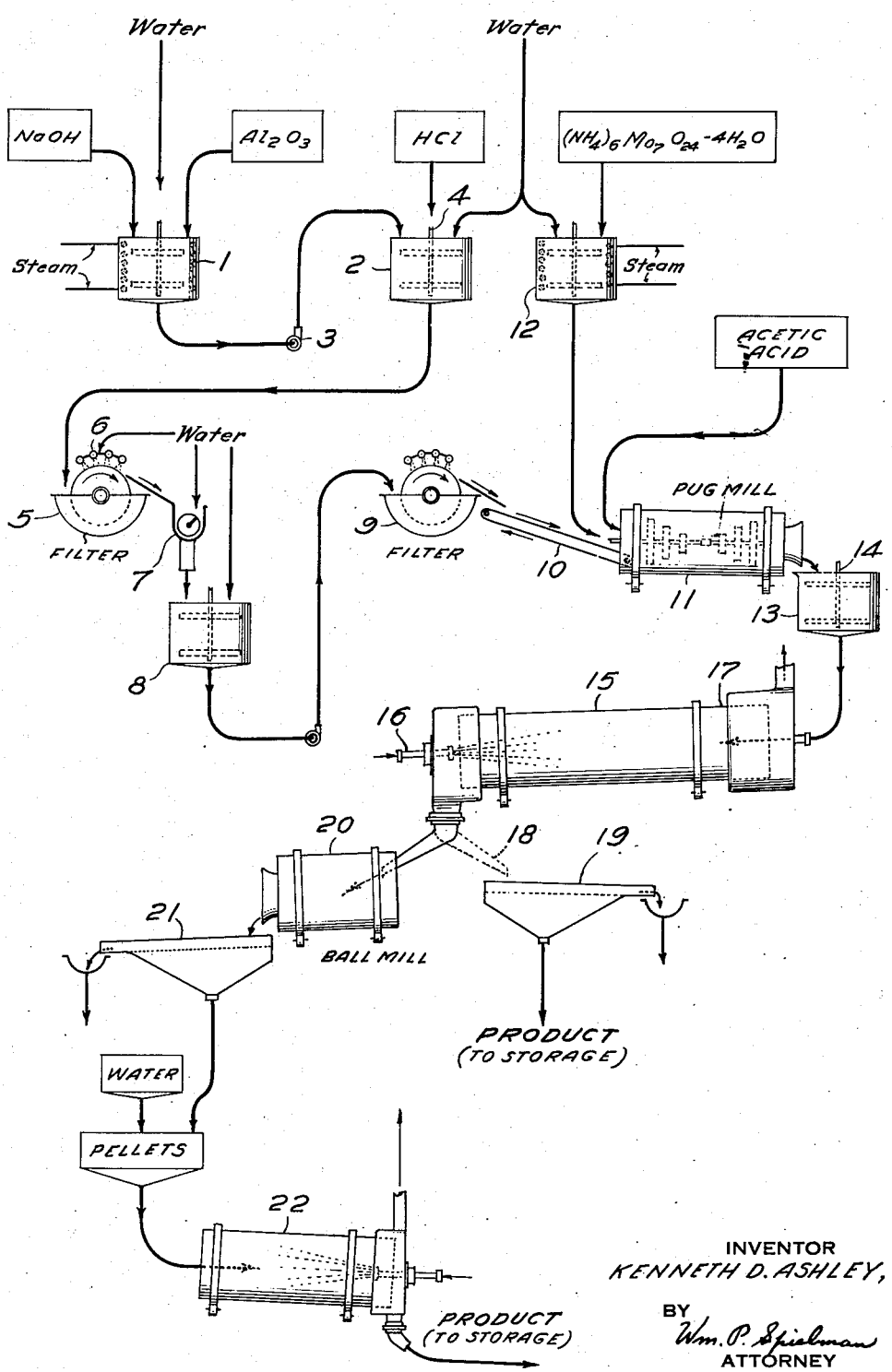

2,657,184

UNITED STATES PATENT OFFICE 2,657,184

ALUMINA GEL-CONTAINING CATALYSTS

Kenneth D. Ashley, Stamford, Conn., assignor to American Cyanamid Company, New York, N. Y., a corporation of Maine Application March 10, 1950, Serial No. 148,979

6 Claims. (Cl. 252—465)

This invention relates to activated alumina gel catalysts, and more particularly to catalysts of this class composed of alumina gel having one or more additional metal oxide catalysts or promoters therein. Although the invention is directed primarily to improved methods for the manufacture of catalysts of this class, it also includes certain novel alumina gel-molybdenum oxide catalysts characterized by a relatively large pore volume within the range of 0.3–0.5 cc. per gram and a correspondingly increased specific surface of at least 250 square meters per gram, as will hereinafter be more fully described.

It is well known that the activity of alumina gel catalysts for many purposes is a function of the specific surface of the catalyst and of its pore volume. For this reason the most highly active alumina gel hydroforming catalysts previously known have been made from alumina sols, such as those obtained by reacting water with amalgamated aluminum metal in the presence of an organic acid such as acetic acid, formic acid and the like. Catalysts having a surface area of as much as 225 square meters per gram have been obtained by this procedure. Unfortunately, however, aluminum hydroxide sols containing more than about 5% total solids cannot be prepared commercially, and as a practical matter a content of 4–4.5% of hydrated alumina is about the highest that can be used. Therefore this method of preparation, although it produces alumina gels having the highest specific surface area previously known, is not well suited for the large scale manufacture of alumina catalysts. This is true because it requires the handling of very large quantities of dilute solutions and the drying of gels of low solids content. One of the principal objects of the present invention is the provision of a method that can be operated at much higher solids content if desired, and which will produce alumina gel catalysts of high activity from aluminum hydroxide filter cakes containing between 10% and 20% solids.

My present invention is based on the concept of first producing an aluminum hydroxide or hydrated aluminum oxide in the form of a granular filter cake having the relatively high solids content of 10–20%, washing this aluminum hydroxide to remove impurities such as alkali metal compounds therefrom, and subsequently peptizing the alumina by reacting the washed filter cake with a water-soluble organic acid. By operating in this manner the necessity of handling large volumes of dilute alumina sols and gels is avoided, with a corresponding increase in plant capacity. Granular aluminum hydroxide filter cakes of this type can be obtained by any of the precipitation and washing methods used in the manufacture of silica-alumina cracking catalysts; for example, those described in U. S. Patent No. 2,326,706 may be employed.

In carrying out the above process I discovered, as an even more important feature of my invention, that the method of producing the aluminum hydroxide has a profound effect on the specific surface of the alumina gel, and therefore on its catalytic activity. I discovered that an aluminum hydroxide precipitate obtained by reacting an alkali metal aluminate solution with an acid produces an alumina gel having an extremely high specific surface after it is treated with a water-soluble organic acid and subsequently calcined. In fact, the alumina gel catalysts produced by this method have specific surfaces not only equal to those previously obtained up to 225 square meters per gram but may exceed these values and may be obtained having higher specific surfaces even ranging from 250 to more than 350 square meters per gram. This is a higher surface area than has previously been attained in a catalyst containing alumina as the only gel-forming metal oxide, although of course cracking catalysts composed principally of silica gel with minor quantities of alumina have a greater specific surface.

In order to convert the freshly precipitated and washed aluminum hydroxide into a gel of increased surface area, I mix it thoroughly with a water-soluble organic acid which is preferably a lower aliphatic acid such as formic acid, acetic acid, glycollic acid, oxalic acid, maleic acid, tartaric acid and the like. For most purposes the best results are obtained with a quantity of organic acid within the range of from about 0.4 to 2 mols for each mol of $Al_2O_3$ in the precipitate. When these quantities of acid are used the previously stiff aluminum hydroxide cake is converted into a relatively thin paste which sets on drying and calcining to an aluminum oxide gel of good mechanical strength and high specific surface.

In the manufacture of coated or impregnated alumina hydroforming catalysts it is common practice to include in the alumina gel one or more polyvalent metal oxides; usually an oxide of a metal of the fifth and sixth groups of the periodic system. Thus, for example, one of the best classes of hydroforming catalysts is that in which 2-12% and preferably about 4-10% of molybdenum oxide is incorporated prior to the drying and calcining thereof. Chromium oxide, in amounts ranging from about 2% to about 30% of the weight of the finished catalyst, is also frequently used. Other oxides such as those of tungsten, vanadium or cobalt may be employed. Any one or more of these or other similar metal oxides can be incorporated with the peptized aluminum hydroxide in practicing my process.

From the foregoing it will be seen that my invention consists, first, in the production of aluminum oxide gel catalysts by peptizing with an organic acid an aluminum hydroxide precipitate having a solids content of 10-20%, this precipitate being obtained either from an aluminum salt or from an alkali metal aluminate, and secondly in the production of catalysts of this class having an increased specific surface by the use of aluminum hydroxide precipitated from alkali metal aluminate solutions. Furthermore the invention includes the improved catalysts of high specific surface obtained by this method.

The invention will be described in greater detail with reference to the accompanying drawing wherein the single figure is a flow sheet illustrating a specific embodiment of the invention. Referring to this drawing it will be seen that a sodium aluminate solution may be prepared in the tank 1 by bringing together an aqueous sodium hydroxide solution and an aluminum oxide-bearing material which may be a commercial crystalline aluminum trihydrate of the type known as B. O. C. Alternatively, a good grade of bauxite may be used; in this case, however, the sodium aluminate solution should be filtered or clarified by settling before it is used. Preferably a 10%-25% excess of sodium hydroxide is employed over the amount theoretically necessary to form sodium aluminate with all of the alumina present.

The sodium aluminate solution prepared in the tank 1 is reacted with hydrochloric acid, nitric acid or other mineral acid in the tank 2. A charge of water, which may conveniently be approximately equal in volume to that of the sodium aluminate solution, is first placed in the tank 2. The sodium aluminate solution is then introduced by means of a pump 3 while a stream of hydrochloric acid is added simultaneously, the agitator 4 being operated to provide a thorough admixture of the two ingredients. Preferably a pH meter, not shown, is maintained in operation and the addition of the two ingredients is so controlled as to maintain the pH value within the range of about 5.8 to 8.5 at all times. When the reaction is completed, usually requiring about 40 minutes, a slurry of aluminum hydroxide or hydrated aluminum oxide is obtained that can be filtered and washed readily.

Filtration and washing are completed on the filters 5 and 9, which are preferably continuous rotary vacuum filters as illustrated. The filter cake on the filter 5 was washed continuously, preferably by sprays of water from the pipes 6 which are so arranged as to keep the filter cake wetted from the time of its formation until it is removed from the filter. The filter cake is reslurried with water in a repulper 7 which discharges into a storage tank 8, from which the slurry is pumped onto the second filter 9 where it is again filtered and washed. The cake from the filter 9 contains between 10% and 20% solids and its alkali metal salt content is less than 0.1% expressed as $Na_2O$, and is usually considerably less than 0.05% $Na_2O$.

The filter cake from the second filtration is introduced by a conveyor 10 into a pug mill or other mixing device 11, wherein it is mixed with the proper quantity of acetic acid or other organic acid to obtain the desired degree of activity in the finished catalyst. An ammonium molybdate solution, prepared in the tank 12, is also introduced into the pug mill 11, either simultaneously with the acetic acid addition or shortly thereafter. The preferred quantity of ammonium molybdate is that which will introduce about 6-8 percent of $MoO_3$ into the finishing catalyst. The ingredients are thoroughly mixed and reacted together in the pug mill until a uniform, thin paste is obtained that is discharged into the tank 13 which is provided with a gate-type agitator 14 to maintain the paste in uniform suspension.

The paste in the tank 13 may be dried and converted into finished catalyst by several methods. Thus, for example, it may be heated in an indirect fired rotary kiln at temperatures of about 200-212° F. for 45 minutes in order to completely react any free acetic acid that may be present. The temperature may then be raised to 1000-1500° F. and the batch may be calcined by indirect heating. Preferably, however, one or more direct-fired kilns are employed, and these are illustrated on the drawing.

The kiln 15, which is fired by an oil or gas burner 16 in the lower end thereof, is fed at its upper or inlet end 17 with a stream of catalyst paste from the tank 13. The firing of the kiln may be such that the catalyst material is heated to calcination temperatures of 1000° F. or higher during a period of 2 hours, in which case the calcined material may be discharged through a spout 18 onto a coarse screen 19 from which the calcined product is obtained. Preferably, however, a two-stage drying and calcination is employed in which the paste from the tank 13 is calcined for about 1 hour at temperatures up to 1050-1100° F. in the kiln 15 and the product is discharged into a ball mill 20 where it is ground to a sufficient degree of fineness to pass through a 40 mesh screen 21. The ground and screened catalyst is then mixed with about 20% of its weight of water, and preferably with about 1-2% of graphite and is pelleted on an automatic pelleting machine. Pellets of ⅜ inch diameter are preferably made. These pellets are given a final calcination at about 1100-1200° F., and preferably about 1100° F., in a kiln 22 for a period of time sufficient to remove the moisture incorporated prior to pelleting; this usually requires about 1 hour.

The invention will be further illustrated by the following specific examples which show specific embodiments thereof. It should be understood, however, that the invention in its broader aspects is not limited by these examples, but that variations in ingredients and proportions may be resorted to within the scope of the appended claims.

*Example 1*

A sodium aluminate solution containing the equivalent of 18.5% $Al_2O_3$ was added to an agitated reaction vessel simultaneously with a stream of 20% nitric acid at a rate such that the pH was kept between 6.0 and 6.5. The resulting slurry, containing 6% solids, was filtered and washed with 0.01% nitric acid wash water until the sodium salt content of the filter cake was below 0.03% expressed as Na₂O. The cake contained 18% solids.

To a portion of this filter cake weighing 7.05 pounds there was added 0.445 pound of glacial acetic acid at room temperature, this being 0.6 mol of acid per mol of alumina. After thorough mixing 0.135 pound of fine crystals of ammonium molybdate were added and thoroughly distributed. The mix was allowed to stand overnight, during which time it set to a soap-like solid. This solid was calcined at 1050° F. for 1.1 hours in an indirect-fired rotary kiln and the calcined material was ground so that 40% passed through a 200 mesh Tyler screen and then made into a damp powder for pelleting. This was done by mixing 100 parts by weight of the powder with 34 parts of water and 2.6 parts of graphite. The granular mass was formed into pellets ⅜ inch in diameter which were calcined at 1100° F. to remove their moisture content. The specific surface of the catalyst so prepared was determined by the standard B. E. T. method, which is based on low temperature nitrogen absorption. See J. A. C. S. 60, 309 (1938). The specific surface was 220 square meters per gram of catalyst and the pore volume was 0.32 cc. per gram.

*Example 2*

To 8.32 pounds of a hydrous alumina cake containing 20.3% solids, prepared from sodium aluminate solution and nitric acid as in Example 1, there was added 1.99 pounds of glacial acetic acid or 2.0 mols of acid per mol of alumina. A portion of the mixture weighing 3.19 pounds was taken and 0.67 pound of ammonium molybdate was added and the whole mixed until uniform. Calcination to 1050° F. was carried out in 3.5 hours in an indirect-fired rotary kiln after which the product was ground, pelleted and again calcined as in Example 1. The specific surface of the catalyst pellets was 232 sq. meters per gram, and the pore volume was 0.28 cc. per gram.

*Example 3*

A sodium aluminate solution was prepared by adding 9.24 pounds of B. O. C. (crystalline aluminum trihydrate containing 65% Al₂O₃) to 16 pounds of 49% NaOH solution at 110–120° C. with agitation and then diluting with hot water to 25% Al₂O₃. A charge of 31 pounds of water was placed in an agitated vessel and 24 pounds of the above solution were added in a thin stream simultaneously with 35.3 pounds of 16.5% hydrochloric acid. The resulting slurry, containing 6.5% Al₂O₃, was filtered and washed with 0.005% nitric acid to a sodium salt content of less than 0.01% Na₂O on a total solids basis. The filter cake contained 18.2% solids.

To this filter cake there was added at 55–70° C. a quantity of glacial acetic acid equal to 0.88 pound per pound of Al₂O₃. After mixing 20 minutes, 1290 grams of ammonium molybdate solution containing 18% MoO₃ was added to introduce 8% MoO₃ into the finished catalyst and the mixing was continued until a uniform paste was obtained.

One portion of this paste was calcined in an indirect-fired rotary kiln at 1050° F. for 3 hours, then ground to pass 40 mesh, mixed with 2% of its weight of graphite, and made into ⅜ inch pellets. These were calcined at 1100° F. and tested. The specific surface was 314 square meters per gram and the pore volume was 0.39 cc. per gram.

*Example 4*

Another portion of the alumina-molybdena paste of Example 3 was calcined at 420° F. for about 1 hour and then ground to pass a 40 mesh screen. The powder was mixed with 20% of its weight of water and 2% of graphite and made into ⅜ inch pellets. These were heated to 1050–1100° F. for about 2 hours to complete the calcination. The specific surface of the resulting catalyst was 374 square meters per gram and its pore volume was 0.5 cc. per gram.

The catalyst was tested for thermal stability by heating it for 5 hours at 1475° F. The specific surface was then 238 and the pore volume was 0.49.

*Example 5*

A solution containing 11.5 lbs. of iron-free aluminum sulfate (17.4% Al₂O₃) and 21.9 lbs. of water was prepared.

A reaction vessel equipped with an agitator was charged with one liter of water. The agitator was started and 29.8 lbs. of the above alum solution were added during a period of one hour simultaneously with the addition of 16 lbs. of a 12% ammonia solution, the pH of the alumina slurry being maintained at 5.0 to 5.5 during the reaction. The resulting slurry, which weighed 46.87 lbs. and contained 1.78 lbs. of Al₂O₃, was aged 30 minutes and was then filtered and washed five times with deionized water. The filter cake was dried at 110° C. and then calcined at 1100° F. for one hour.

The specific surface of the alumina prepared by this method was 31 square meters per gram.

What I claim is:

1. A method of producing alumina gel-containing catalyst of high surface activity which comprises precipitating aluminum hydroxide from an alkali metal aluminate solution by reacting it with a mineral acid while maintaining the pH of the reaction mixture between 5.8 and 8.5, filtering and washing the aluminum hydroxide so produced thereby forming a filter cake containing between 10% and about 20% solids, mixing the resulting filter cake containing between 10% and about 20% solids with a quantity of a water-soluble organic acid within the range of 0.5–2 mols for each mol of Al₂O₃ in the filter cake, incorporating 2–30% of an oxide of a polyvalent metal selected from the fifth and sixth groups of the periodic system into the resulting peptized aluminum hydroxide paste, and calcining the product.

2. A method according to claim 1 in which the polyvalent metal oxide is MoO₃.

3. A method of producing an alumina gel-containing catalyst of high surface activity which comprises precipitating aluminum hydroxide from an alkali metal aluminate solution by reacting it with a mineral acid while maintaining the pH of the reaction mixture between 5.8 and 8.5, filtering and washing the aluminum hydroxide so produced thereby forming a filter cake containing between 10% and about 20% solids, mixing the resulting filter cake containing between 10% and about 20% solids with 0.5–2 mols of acetic acid for each mol of Al₂O₃ therein, adding sufficient ammonium molybdate to incorporate about 4–10% of MoO₃ in the finished product, mixing thoroughly and calcining the resulting catalyst.

4. A method of producing an alumina gel-containing catalyst of high surface activity which comprises precipitating aluminum hydroxide from an alkali metal aluminate solution by reacting it with a mineral acid while maintaining the pH of the reaction mixture between 5.8 and 8.5, filtering and washing the aluminum hydroxide so produced and thereby forming a washed filter cake of 10%–20% solids, mixing said cake with a quantity of water-soluble aliphatic organic acid within the range of 0.5–2 mols for each mol of $Al_2O_3$ therein, incorporating 4–10% of molybdenum oxide into the resulting peptized aluminum hydroxide paste, and calcining the product.

5. A process according to claim 4 in which the organic acid is glacial acetic acid.

6. A method of producing an alkali metal-free aluminum hydroxide which comprises reacting an alkali metal aluminate solution with a mineral acid to form a precipitate of aluminum hydroxide while maintaining the pH of the reaction mixture between 5.8 and 8.5 during the entire precipitation so that all of said aluminum hydroxide is precipitated within said pH range between 5.8 and 8.5 and is thereby formed in an easily filterable and washable condition, filtering the resulting slurry of aluminum hydroxide, washing the filter cake with water, mixing the resulting filter cake with a quantity of a water-soluble organic acid within the range of 0.5–2 mols for each mol of $Al_2O_3$ in the filter cake, incorporating 2–30% of an oxide of a polyvalent metal selected from the fifth and sixth groups of the periodic system into the resulting aluminum hydroxide paste, and calcining the product.

KENNETH D. ASHLEY.

References Cited in the file of this patent

UNITED STATES PATENTS

| Number | Name | Date |
|---|---|---|
| 2,340,935 | Connolly | Feb. 8, 1944 |
| 2,406,420 | Weiser et al. | Aug. 27, 1946 |
| 2,408,131 | Voorhies | Sept. 24, 1946 |
| 2,423,947 | Pitzer | July 15, 1947 |
| 2,487,076 | Sharp | Nov. 8, 1949 |

FOREIGN PATENTS

| Number | Country | Date |
|---|---|---|
| 547,246 | Great Britain | Aug. 20, 1942 |